US007627159B2

United States Patent
Kiraly et al.

(10) Patent No.: US 7,627,159 B2
(45) Date of Patent: Dec. 1, 2009

(54) 2D VISUALIZATION FOR RIB ANALYSIS

(75) Inventors: Atilla Peter Kiraly, Plainsboro, NJ (US); Hong Shen, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 611 days.

(21) Appl. No.: 11/256,864

(22) Filed: Oct. 24, 2005

(65) Prior Publication Data

US 2007/0249910 A1     Oct. 25, 2007

Related U.S. Application Data

(60) Provisional application No. 60/623,057, filed on Oct. 28, 2004.

(51) Int. Cl.
*G06K 9/00* (2006.01)
(52) U.S. Cl. .................................. 382/131
(58) Field of Classification Search ........... None
See application file for complete search history.

(56) References Cited

U.S. PATENT DOCUMENTS

2002/0168110 A1   11/2002   Al-Kofahi et al.

OTHER PUBLICATIONS

Zhan Zhang el al: "A prototype colon straightening system for polyp detection" Proc. 11th IEEE Symposium on Computer—Based Medical Systems, CA, USA, 2004, pp. 548-552, XP010708019 ISBN: 0-7695-2104-5 p. 548, last paragraph—p. 549, paragraph 2 p. 550, paragraph 1.

Hong Shen et al: "Tracing based segmentation for the labeling of individual rib structures in chest CT volume data" Medical Image Computing and Computer—Assisted Intervention_MICCAI 2004. 7th Int. Conf. (Lecture Notes in Comput. Sci. vol. 3217) Springer—Verlag Berlin, Germany, vol. 2, 2004, pp. 967-974 vol. 2, XP009061289 cited in the application p. 970, paragraph 3_page 971, paragraph 7.

Grevera G J et al: "GMIP: generalized maximum intensity projection" Proceedings of the SPIE_ The International Society for Optical Engineering SPIE—Int. Soc. Opt. Eng USA, vol. 5367, No. 1, May 24, 2004, pp. 636-645, XP008110879 ISSN: 0277-786X p. 636, last paragraph_page 638, paragraph 2.

Zhang Z et al: "Colon straightening based on elastic mechanics model" 2004 2nd IEEE International Symposium on Biomedical Imaging:, Macro to Nano IEEE Piscataway, NJ, USA, vol. 1, 2004, pp. 292-295 vol., XP010773855 ISBN: 0-7803-8388-5 p. 292, right-hand column, paragraph 1_paragraph 2.

Silver D et al: "Reshaping Medical Volumetric Data for Enhanced Visualization" Medicine Meets Virtual Reality Conference vol. 2/10, Jan. 23, 2002, pp. 488-493, XP009061681 abstract; figures 1,2 p. 489, paragraph 3 _p. 490, last paragraph.

*Primary Examiner*—Charles Kim
(74) *Attorney, Agent, or Firm*—Donald B. Paschburg; F. Chau & Associates, LLC

(57) ABSTRACT

An exemplary method of visualization is provided. A centerline is computed for each of a plurality of ribs in a three-dimensional (3D) image. The each of the plurality of ribs is straightened based on the centerline computation. A two-dimensional (2D) image is generated based on the straightened ribs.

18 Claims, 3 Drawing Sheets

2D VISUALIZATION FOR RIB ANALYSIS

CROSS-REFERENCE TO RELATED APPLICATIONS

This application claims priority to U.S. Provisional Application No. 60/623,057, which was filed on Oct. 28, 2004, and which is fully incorporated herein by reference.

BACKGROUND OF THE INVENTION

1. Field of the Invention

The present invention relates generally to the field of medical imaging, and, more particularly, to a two-dimensional ("2D") visualization for rib analysis.

2. Description of the Related Art

High-resolution computed tomography ("CT") volumes of the chest are commonly used to diagnose abnormalities in the ribs. Current technology provides CT volumes of the chest with at least 400 two-dimensional ("2D") slices. Thorough evaluation of thoracic CT scans frequently requires physicians to identify and track the individual ribs structures in the volume data. This can be a tedious task as the ribs occupy multiple slices within the data. More precisely, the ribs typically cross through the axial planes at an oblique angle, thereby making their examination even more problematic. To analyze the CT volumes, the radiologist must scroll through all slices, and view the contents of the ribs while tracking the ribs through each slice. Also, given a rib in an arbitrary slice, the radiologist must scroll up and down to determine the number of the rib.

Given the three-dimensional ("3D") segmentation of the ribs, a 3D view showing only the ribs and their contents is possible. This 3D view alleviates the necessity of tracking and scrolling through 2D slices. However, since in any single view, the ribs occlude one another, 3D navigation is of absolute necessity. This makes it necessary to have an interface to position and move the rendering camera. In addition, the three-dimensional modality requires the radiologist to view the same rib multiple times since the same region is rendered continuously.

SUMMARY OF THE INVENTION

In one aspect of the present invention, a method of visualization is provided. The method includes the steps of straightening each of a plurality of ribs in a three-dimensional (3D) image based on a centerline in the each of the plurality of ribs; and generating a two-dimensional (2D) image based on the straightened ribs.

In another aspect of the present invention, a machine-readable medium having instructions stored thereon for execution by a processor to perform a method of visualization is provided. The method includes the steps of straightening each of a plurality of ribs in a three-dimensional (3D) image based on a centerline in the each of the plurality of ribs; and generating a two-dimensional (2D) image based on the straightened ribs.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Figure 1:
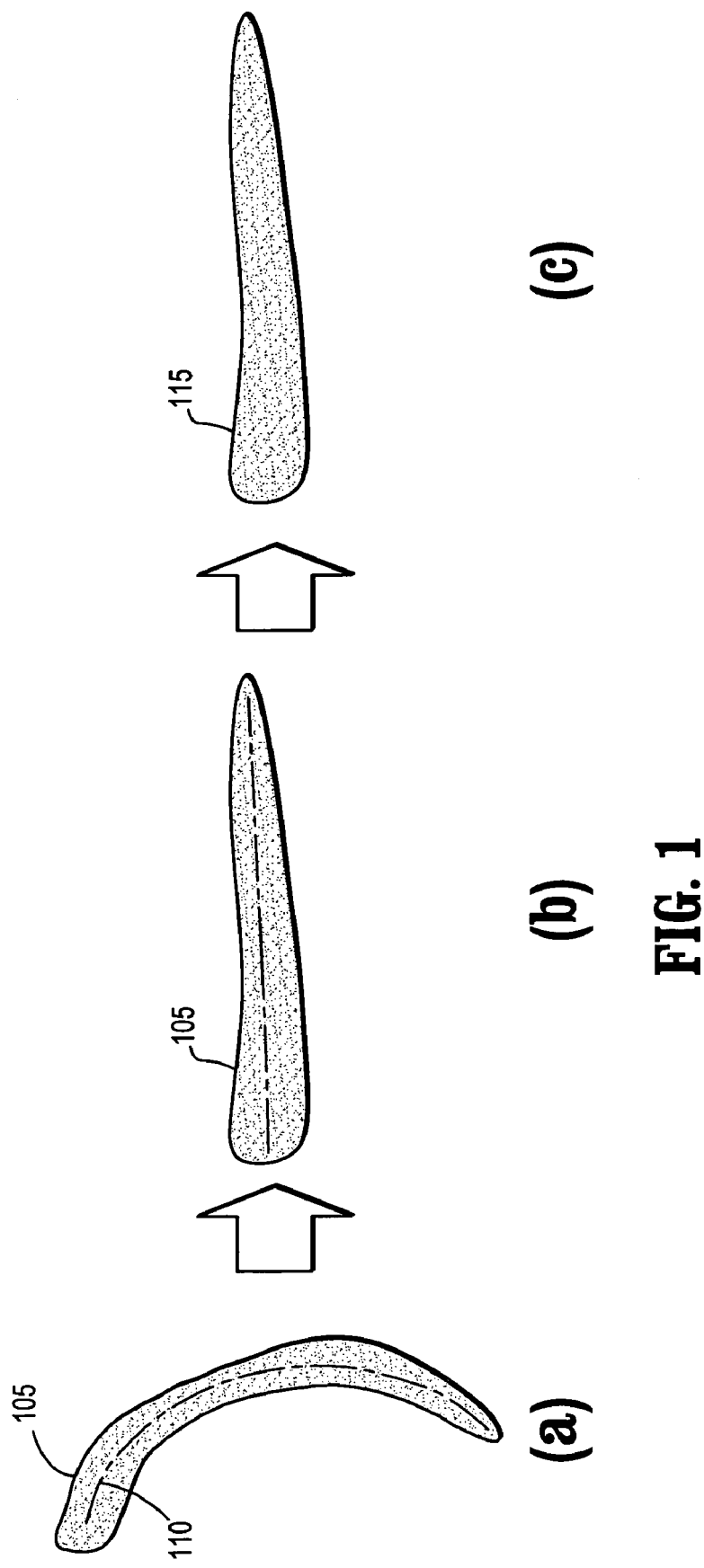
FIG. 1 depicts a process involving segmenting a rib, straightening a rib, and displaying the rib, in accordance with one exemplary embodiment of the present invention.

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

We present an novel method for eliminating the complex navigation and tracking issues present in prior art modalities. We introduce the ability to visualize all of the rib contents within a single two dimensional ("2D") image. Our method makes use of proper rib segmentation and centerline computation. It is possible to use the method with only the centerlines as well. The segmentation identifies the ribs within the image, while the centerlines, in this example, are computed using the segmentation. Note that other methods of computing the centerline without the segmentation are possible. Given these two data elements, the ribs can be digitally straightened and the contents limited to the segmentation can be displayed within a single 2D image. This presentation avoids any navigational issues faced by a three-dimensional ("3D") display and avoids the rib tracking present when viewing slices. The result is a single 2D page that can be read like a book in a left-to-right and top-to-bottom fashion. For example, the present invention may be used to reformat computed tomography ("CT") data to simplify the analysis of ribs.

Generally, our method takes the segmentation of the individual ribs, and particularly their centerlines, to create a single 2D image with the rib information. An exemplary embodiment of the novel method will now be described in greater detail.

All ribs are individually segmented. Although not so limited, exemplary methods for segmenting ribs are described in the following references, each of which is fully incorporated by reference:

(1) Hong Shen and Lichen Liang, Method for analyzing medical image data, U.S. patent application Ser. No. 11/344,277, filed on Jan. 18, 2006;

(2) Hong Shen, Lichen Liang, Min Shao, Shuping Qing, and David P. Naidich, A System for Automatic Rib Labeling in Chest CT Volume Data, the Conference of Radiological Society of North America, Chicago, Ill., 2004; and (3) Hong Shen, Lichen Liang, Min Shao, and Shuping Qing, Tracing Based Segmentation for Labeling of Individual Rib Structures in Chest CT Volume Data, Proceedings of the 7$^{th}$ International Conference on Medical Image Computing and Computer Assisted Intervention, Rennes, Saint-Malo, France, September, 2004. Other rib segmentation methods or rib centerline computation methods can be used herein, as long as the ribs are segmented individually.

In the present exemplary embodiment, we use a rib segmentation method based on 3D recursive tracing. First, seed points are obtained from a coronal plane close to the center of the chest. This plane makes intersections with all of the ribs, but excludes any point originating from the spine or sternum. Using 2D shape analysis on this plane, one seed point is obtained for each rib. Tracing starts from a seed point on two initial directions of each rib. The tracing direction for each tracing step is updated using the information extracted from the previous step. At each recursive step, 3D edge operators are applied to extract the rib edges points. Statistical analysis is used to reliably extract the local contour of the rib cross-section and to determine the next tracing direction of the next step. A set of stopping rules is designed to allow good traces to continue but to terminate when appropriate. This rib segmentation method has the advantage of extracting both the centerlines and contours simultaneously. Subsequently the extracted ribs are ordered and labeled according to their relative spatial relationships and length ratios.

Given the ordered and labeled segmentation results, particularly the centerlines, it is possible to digitally straighten each rib within the image about its centerline. Even with only a centerline it is possible to straighten the local volume about the centerline. Since each centerline is comprised of a series of contiguous sites, a local direction can be assigned to each individual point based upon the heading of neighboring points. A 2D cross-section perpendicular to the local direction can then be taken at each site and the results can be stacked on top of one another to form a new volume. The end effect of this process is a volume that is straightened by the centerline. A similar approach has been proposed in the case of blood vessels in the following references, the disclosures of which are fully incorporated by reference:

(1). A. Kiraly and C. Novak, "System and Method for Tree-Model Visualization for Pulmonary Embolism Detection", U.S. patent application Ser. No. 11/194,252, filed on Aug. 1, 2005; and (2). A. Kiraly, D. Naidich, and C. Novak "2D display of a 3D tree for pulmonary embolism detection," International Congress Series (CARS), pp. 1132-1136, 2005.

The straightened ribs can be combined into a single 3D volume and viewed by traditional slice-based means. With such a view, all ribs are simultaneously visible, eliminating tracking them through the slices. In addition, the volume of each straightened rib can be converted into a 2D image. Any of a variety of methods, such as projection, animation, and the like, may be utilized, as contemplated by those skilled in the art. Some examples include the maximum intensity projection ("MIP") or the average intensity projection. Given a workstation, it is also possible to provide animations of the ribs via 3D rendering or showing 2D cross-sections.

Referring now to FIG. 1, the process of segmenting a rib to straightening a rib to displaying the rib is shown. In FIG. 1(a), a rib 105 is segmented and its centerline 110 is computed. In FIG. 1(b), the rib 105 is digitally straightened. In FIG. 1(c), a 2D image of the rib 105 is computed. The computation may be a projection, animation, or any other method that allows the conversion of a 3D volume into a 2D plane.

Figure 2:
FIG. 2 depicts a plurality of labeled ribs, in accordance with one exemplary embodiment of the present invention.
Figure 2:
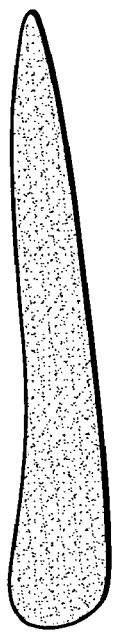
Figure 2:
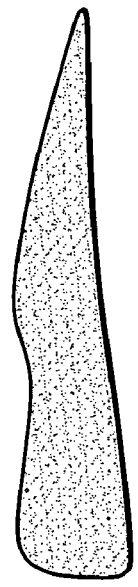
Figure 2:
Figure 2:
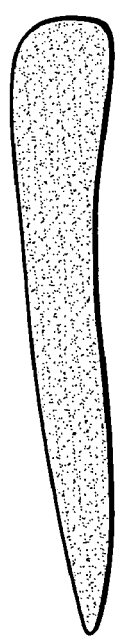
Figure 2:
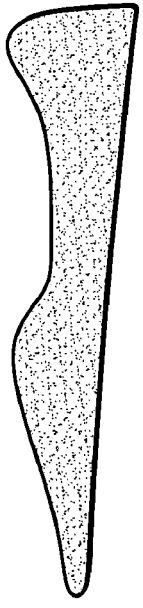
Figure 2:

Once the image is computed for each rib, the resultant images can be stacked in the order of appearance of the ribs within the volume. A label can be added to clarify which rib number is being shown. FIG. 2 shows a plurality of labeled ribs (e.g., rib #1, rib #2). Although not so limited, the ribs are displayed in FIG. 2 in hierarchal order. Such a presentation allows a medical professional (e.g., radiologist) to analyze the ribs without complex navigation or time-consuming tracking. Further, such a presentation provides a natural way of viewing the rib data, similar to how one reads a book.

It should be appreciated that various possibilities exist for a user interface based on this presentation. A number of variations of this method exist due to the different segmentation, centerline, and projection method possibilities.

Within a workstation display, the medical professional (e.g., a radiologist) can click on any suspicious region and immediately view the traditional axial slices or view any other modality for visualizing the ribs. Prior art methods do not allow processed data to be displayed to the medical professional in such a manner.

Figure 3:
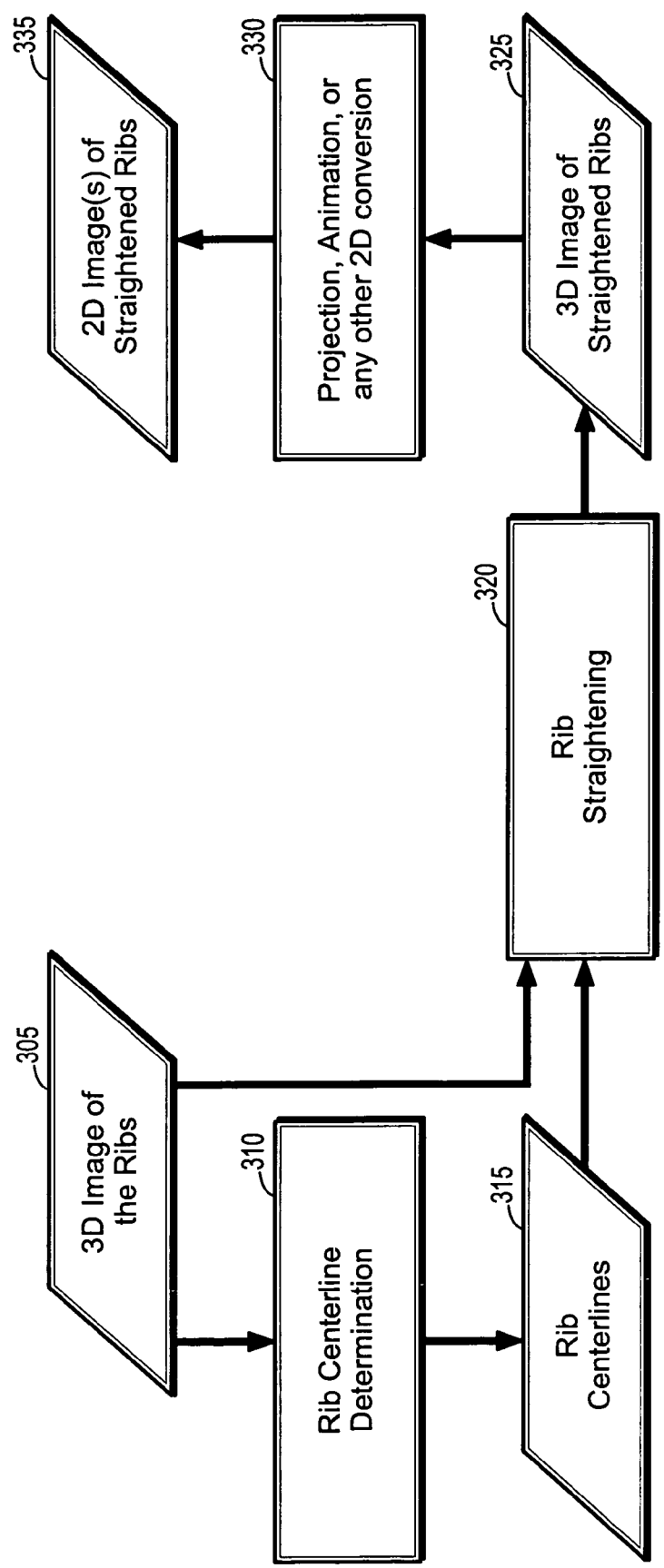
FIG. 3 depicts a flow diagram illustrating the present invention, in accordance with one exemplary embodiment of the present invention.

FIG. 3 depicts a flow diagram illustrating a method of visualization, in accordance with an exemplary embodiment of the present invention. Given a 3D image of ribs 305, a rib centerline 315 is determined (at 310) for each of the ribs. Each of the ribs are straightened (at 320) given the 3D image of ribs 305 and the rib centerlines 315. The result of step 320 is a 3D image of a plurality of straightened ribs 325. The plurality of straightened ribs 325 converted (at 330) into a 2D image of the straightened ribs 335. Examples of the step of converting (at 330) include, but is not limited to, projection and animation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of visualization, comprising:
   receiving three-dimensional (3D) medical image data including a plurality of ribs;

segmenting a solid image volume for each of the plurality of ribs within the medical image data;
determining a centerline for each of the segmented solid rib volumes;
straightening each of the segmented solid rib volumes based on the respective centerlines; and
generating a two-dimensional (2D) image based on the straightened segmented solid rib volumes; and
displaying the generated 2D image based on the straightened segmented solid rib volumes to a user;
receiving an input from the user indicating a selection of a region of interest within the displayed 2D image; and
displaying a portion of the un-straightened solid image volume corresponding to the selected region of interest from the displayed 2D image.

2. The method of claim 1, wherein the step of segmenting the solid image volume for each of the plurality of ribs within the medical image data, comprises:
obtaining a seed point for the each of the plurality of ribs;
tracing from the seed point in each direction of the each of the plurality of ribs; determining rib edge points of the each of the plurality of ribs; and
extracting a local contour of the each of the plurality of ribs based on the steps of tracing and data from the previous step.

3. The method of claim 2, further comprising:
ordering and labeling the extracted contours according based on relative spatial relationships and length ratios of the extracted contours.

4. The method of claim 1, wherein the 3D medical image data comprises a computed tomography (CT) image of a chest.

5. The method of claim 1, wherein the step of generating a 2D image based on the straightened ribs, comprises:
performing a projection on the segmented solid rib volumes to generate the 2D image.

6. The method of claim 5, wherein the step of performing a projection on the segmented solid rib volumes to generate the 2D image, comprises:
performing a maximum intensity projection (MIP) on the straightened ribs to generate the 2D image.

7. The method of claim 5, wherein the step of performing a projection on the segmented solid rib volumes to generate the 2D image, comprises:
performing an average intensity projection on the segmented solid rib volumes to generate the 2D image.

8. The method of claim 1, wherein the step of generating a 2D image based on the segmented solid rib volumes, comprising:
performing an animation on the segmented solid rib volumes to generate the 2D image.

9. A computer-readable medium having instructions stored thereon for execution by a processor to perform a method of visualization, the method comprising:
receiving three-dimensional (3D) medical image data including a plurality of ribs;
segmenting a solid image volume for each of the plurality of ribs within the medical image data;
determining a centerline for each of the segmented solid rib volumes;
straightening each of the segmented solid rib volumes based on the respective centerlines; and
generating a two-dimensional (2D) image based on the straightened segmented solid rib volumes; and
displaying the generated 2D image based on the straightened segmented solid rib volumes to a user;
receiving an input from the user indicating a selection of a region of interest within the displayed 2D image; and
displaying a portion of the un-straightened solid image volume corresponding to the selected region of interest from the displayed 2D image.

10. The computer-readable medium of claim 9, wherein the step of segmenting the solid image volume for each of the plurality of ribs within the medical image data, comprises:
obtaining a seed point for the each of the plurality of ribs;
tracing from the seed point in each direction of the each of the plurality of ribs;
determining rib edge points of the each of the plurality of ribs; and
extracting a local contour of the each of the plurality of ribs based on the steps of tracing and data from the previous step.

11. The computer-readable medium of claim 9, further comprising:
ordering and labeling the extracted contours according based on relative spatial relationships and length ratios of the extracted contours.

12. The computer-readable medium of claim 9, wherein the 3D medical image data comprises a computed tomography (CT) image of a chest.

13. The computer-readable medium of claim 9, wherein the step of generating a 2D image based on the straightened ribs, comprises:
performing a projection on the segmented solid rib volumes to generate the 2D image.

14. The computer-readable medium of claim 9, wherein the step of performing a projection on the segmented solid rib volumes to generate the 2D image, comprises:
performing a maximum intensity projection (MIP) on the straightened ribs to generate the 2D image.

15. The computer-readable medium of claim 9, wherein the step of performing a projection on the segmented solid rib volumes to generate the 2D image, comprises:
performing an average intensity projection on the segmented solid rib volumes to generate the 2D image.

16. The computer-readable medium of claim 9, wherein the step of generating a 2D image based on the segmented solid rib volumes, comprising:
performing an animation on the segmented solid rib volumes to generate the 2D image.

17. A method of visualization, comprising:
receiving three-dimensional (3D) medical image data including a plurality of ribs;
segmenting a solid image volume for each of the plurality of ribs within the medical image data;
determining a centerline for each of the segmented solid rib volumes;
straightening each of the segmented solid rib volumes based on the respective centerlines;
displaying the straightened segmented solid rib volumes to a user;
receiving an input from the user indicating a selection of a region of interest within the displayed straightened segmented solid rib volumes; and
displaying a portion of the un-straightened solid image volume corresponding to the selected region of interest from the displayed straightened segmented solid rib volumes.

18. The method of claim 17, wherein the corresponding portion of the un-straightened solid image volume is displayed in axial slices.

* * * * *

UNITED STATES PATENT AND TRADEMARK OFFICE
CERTIFICATE OF CORRECTION

PATENT NO. : 7,627,159 B2  Page 1 of 1
APPLICATION NO. : 11/256864
DATED : December 1, 2009
INVENTOR(S) : Kiraly et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 885 days.

Signed and Sealed this

Second Day of November, 2010

David J. Kappos
*Director of the United States Patent and Trademark Office*